UNITED STATES PATENT OFFICE.

JAMES H. STEBBINS, JR., OF NEW YORK, N. Y.

RED COLORING-MATTER.

SPECIFICATION forming part of Letters Patent No. 313,118, dated March 3, 1885.

Application filed October 8, 1884. (No specimens.)

*To all whom it may concern:*

Be it known that I, JAMES H. STEBBINS, Jr., a citizen of the United States, residing at New York, in the county and State of New York, have invented a new and useful red coloring matter or dye, which may be denominated "benzole-azo-sulphonate of soda-azo-diethylaniline," of which the following is a specification.

My new coloring-matter may be produced in several ways, one of which is as follows:

Dissolve 10.3 pounds amidoazo-benzole-sulphonate of soda in two hundred pounds of water at a gentle heat. The solution is then cooled down and treated with 2.3 pounds of nitrite of sodium dissolved in twenty pounds of water, and then, under constant stirring, with 6.1 pounds of hydrochloric acid of 1.20 specific gravity, or its equivalent of weaker acid. The mixture thus obtained is allowed to rest until the diazoazo-benzole sulpho acid is completely formed, which requires about two hours. The diazo compound is now added, under constant stirring, to a solution composed of diethylaniline 5.1 pounds, in methyl-alcohol twenty pounds. The mixture turns to a red-brown color, and after standing a few hours the alcohol may be recovered by distillation. On cooling the new coloring-matter is deposited as a fine red-brown crystalline mass, which may be collected on a filter and dried. This substance is represented by the following chemical formula: $C_6 H_3 (Na SO_3)$—$N=N—C_6H_4—N=N—C_6H_4—N\begin{matrix}C_2H_5\\C_2H_5\end{matrix}$.

Instead of using methyl-alcohol as a solvent, as described above, the diethylaniline may be dissolved in hydrochloric acid, and the same result will be obtained.

This new coloring-matter produces a fine brownish-red color upon articles which are dyed with it, and it possesses the following distinguishing characteristics: It dissolves sparingly in cold water, but very freely in hot water, with a fine red-brown color. Acids added to its aqueous solution change the color to a fine violet, and upon alkalies being added the original color is restored. It dissolves in strong sulphuric acid with a brown color, and in strong hydrochloric acid with a deep-blue color, which upon the addition of water turns violet, and the dye-stuff is precipitated. Reducing agents—such as tin and hydrochloric acid, or stannous chloride and hydrochloric acid—decompose the coloring-matter, splitting it up into paraphenylendiamine, sulphanilic acid, and para-amido diethylaniline. Animal fiber is dyed, in a neutral or slightly-acid bath, of a fine brownish-red shade.

What I claim, and desire to secure by Letters Patent, is—

The red coloring-matter having the formula and characteristics set forth, and which is denominated "benzole-azo-sulphonate of soda-azo-diethylaniline."

JAMES H. STEBBINS, JR.

Witnesses:
T. O. CAMSLOAM,
WILLIAM WICHERT.